(12) United States Patent
Li et al.

(10) Patent No.: US 11,955,636 B2
(45) Date of Patent: Apr. 9, 2024

(54) RECHARGEABLE LITHIUM SULFUR AND/OR SELENIUM BATTERY

(71) Applicant: UCHICAGO ARGONNE, LLC, Chicago, IL (US)

(72) Inventors: Matthew Li, Chicago, IL (US); Khalil Amine, Oakbrook, IL (US); Jun Lu, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 53 days.

(21) Appl. No.: 17/477,828

(22) Filed: Sep. 17, 2021

(65) Prior Publication Data

US 2022/0123312 A1    Apr. 21, 2022

Related U.S. Application Data

(60) Provisional application No. 63/082,520, filed on Sep. 24, 2020.

(51) Int. Cl.

| | |
|---|---|
| *H01M 4/00* | (2006.01) |
| *H01M 4/58* | (2010.01) |
| *H01M 10/0525* | (2010.01) |
| *H01M 10/0569* | (2010.01) |
| *H01M 4/02* | (2006.01) |

(Continued)

(52) U.S. Cl.
CPC ..... *H01M 4/5815* (2013.01); *H01M 10/0525* (2013.01); *H01M 10/0569* (2013.01); *H01M 2004/027* (2013.01); *H01M 2004/028* (2013.01); *H01M 4/133* (2013.01); *H01M 4/134* (2013.01); *H01M 4/625* (2013.01); *H01M 4/661* (2013.01); *H01M 2300/0028* (2013.01)

(58) Field of Classification Search
CPC .. H01M 4/625; H01M 10/4235; H01M 4/382; H01M 10/052; H01M 4/136; Y02E 60/10
See application file for complete search history.

(56) References Cited

U.S. PATENT DOCUMENTS

| | | | |
|---|---|---|---|
| 2015/0064575 A1* | 3/2015 | He .......... | H01M 4/625 429/300 |
| 2019/0393510 A1* | 12/2019 | He .......... | H01M 4/628 |

OTHER PUBLICATIONS

Hart, N., Shi, J., Zhang, J., Fu, C., & Guo, J. (2018). Lithium sulfide%u2013carbon composites via aerosol spray pyrolysis as cathode materials for lithium%u2013sulfur batteries. Frontiers in Chemistry, 6(476), 1%u20137. https://doi.org/10.3389/fchem.2018.00476.

(Continued)

*Primary Examiner* — Cynthia H Kelly
*Assistant Examiner* — Monique M Wills
(74) *Attorney, Agent, or Firm* — Foley & Lardner LLP

(57) ABSTRACT

An electrochemical device includes a cathode comprising a first cathode component of lithium and $Se_xS_y$; and a second cathode component of an alkali metal and/or alkaline earth metal sulfur and/or selenide, different from the first cathode component; an initial discharge product of a polyselenide and/or polysulfide anion charge compensated by an alkali metal and/or alkaline earth metal cation; an anode; a porous separator; and a non-aqueous electrolyte with one or more lithium salts, and one or more solvents; wherein the electrochemical device is a lithium sulfur and/or lithium selenide battery.

19 Claims, 9 Drawing Sheets

(51) Int. Cl.
    *H01M 4/133*    (2010.01)
    *H01M 4/134*    (2010.01)
    *H01M 4/62*     (2006.01)
    *H01M 4/66*     (2006.01)

(56) References Cited

OTHER PUBLICATIONS

Tsao, Y., Lee, M., Miller, E. C., Gao, G., Park, J., Chen, S., Katsumata, T., Tran, H., Wang, L.-W., Toney, M. F., Cui, Y., & Bao, Z. (2019). Designing a quinone-based redox mediator to facilitate li2s oxidation in Li-S Batteries. Joule, 3(3), 872%u2013884. https://doi.org/10.1016/j.joule.2018.12.018.

* cited by examiner

RECHARGEABLE LITHIUM SULFUR AND/OR SELENIUM BATTERY

CROSS REFERENCE TO RELATED APPLICATIONS

This application claims the benefit of priority to U.S. Provisional Patent Application No. 63/082,520 filed Sep. 24, 2020, which is hereby incorporated by reference, in its entirety for any and all purposes.

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to highly energy efficient lithium sulfur batteries having particles of micron-sized lithium sulfide using metal sulfides as activating agents.

SUMMARY

In one aspect, an electrochemical device includes cathode comprising: a first cathode component comprising lithium and $Se_xS_y$, wherein x+y=1, 0≤x≤1, and 0≤y≤1; and a second cathode component comprising an alkali metal sulfide, an alkali metal selenide, an alkaline earth metal sulfide, an alkaline earth metal selenide, or a mixture of any two or more thereof; an anode; a porous separator; and a non-aqueous electrolyte comprising one or more lithium salts, and one or more aprotic solvents. The device may be a lithium sulfur and/or lithium selenide battery; and the first and second cathode components are different.

In any of the above embodiments, the anode may include lithium, or the anode may be lithium free prior to application of a first charging current. In some embodiments, the device is an as-prepared device. As used herein, "an as-prepared device" is one that is assembled and is prior to the application of the first charging current.

In some embodiments, the device further includes an initial discharge product comprising a polyselenide and/or polysulfide anion compensated by an alkali metal and/or alkaline earth metal cation.

In any of the above embodiments, the lithium salt includes a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2',2''-tris(trifluoromethyl)benzotris(imidazolate); $LiN(CN)_2$; $Li[SO_3CF_3]$; $Li[CF_3CO_2]$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiClO_4$; $LiBF_4$; $LiAsF_6$; $LiSbF_6$; $LiAlCl_4$; $LiPF_6$; $LiNO_3$; $Li_2SO_4$; $LiOH$; $Li[BF_2(C_2O_4)]$; $Li[B(C_2O_4)_2]$; $Li[PF_2(C_2O_4)_2]$; $Li[PF_4(C_2O_4)]$; $LiAsF_6$; $LiSbF_6$; $LiNO_3$; $Li_2(B_{12}X_{12-p}H_p)$; $Li_2(B_{10}X_{10-p'}H_{p'})$; or a mixture of any two or more thereof, wherein X is independently at each occurrence F, Cl, Br, or I, p is 0, 1, 2, 3, 4, 5, 6, 7, 8, 9, 10, 11, or 12, and p' is 0, 1, 2, 3, 4, 5, 6, 7, 8, 9, or 10. In any of the embodiments herein, the lithium salt may include $Li[N(SO_2CF_3)_2]$ and $LiNO_3$.

In any of the above embodiments, a ratio of the first cathode component to the second cathode component is from 0.01 to 99.99. In any of the above embodiments, a ratio of the first cathode component to the second cathode component is from 80 to 10. In any of the above embodiments, the second cathode component may include sodium sulfide, sodium selenide, or a mixture thereof. In any of the above embodiments, the percentage of lithium sulfide relative to the combined lithium and alkali sulfide content may be from 99.99 to 50 wt %. In any of the above embodiments, a ratio of lithium ions to sodium ions may be from 80 to 10.

In any of the above embodiments, the aprotic solvent may include an ether. In any of the above embodiments, the ether may be dimethoxyethane (DME), 1,3-dioxolane (DOL), diethylene glycol dimethyl ether (DEGDME), triethylene glycol dimethyl ether, tetraethylene glycol dimethyl ether (TEGDME), or a mixture of any two or more thereof.

In any of the above embodiments, the cathode, prior to a first discharge charge cycle, is free of polysulfide anion, polyselenide anion, elemental sulfur, and elemental selenium. However, in any of the above embodiments, the electrochemical device may be configured to, after a first charge cycle, include elemental sulfur or selenium.

In any of the above embodiments, the anode may include lithium, lithiated carbon, lithiated tin, lithiated silicon, sodium, sodiated carbon, sodiated tin, sodiated silicon, potassium, potassiated carbon, potassiated tin, potassiated silicon, magnesium, magnesiated carbon, magnesiated tin, magnesiated silicon, zinc, zincated carbon, zincated tin, zincated silicon, or a mixture of any two or more thereof.

In another aspect, a process of charging any of the batteries or electrochemical devices described herein is provided, the process including applying a first charging current to the electrochemical device in an as-assembled, uncharged state to form polysulfide and/or polyselenide anions within the electrolyte. In any such embodiments, the polysulfide and/or polyselenide anions are charge compensated by non-lithium alkali metal cations and/or alkaline earth metal cations in the electrolyte. In any such embodiments, it is noted that upon further application of the first charging current, elemental sulfur is formed.

DETAILED DESCRIPTION

Figure 1:
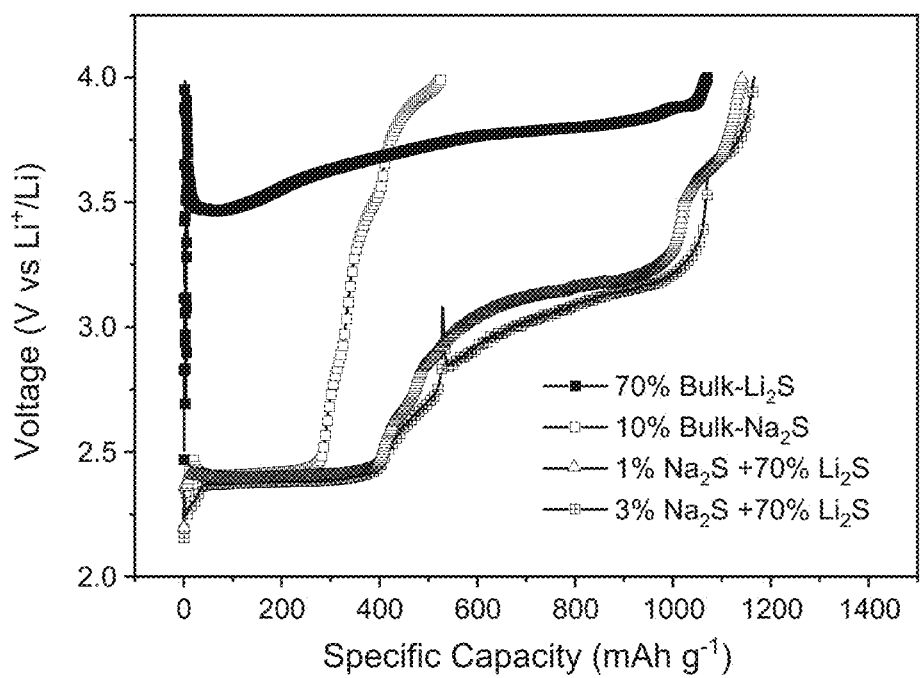
FIG. 1 is a composite graph of the $1^{st}$ charge voltage profile for lithium sulfur batteries having 0, 1, and 3 wt % bulk-$Na_2S$ and 70 wt % bulk-$Li_2S$ in the cast electrode composition, according to the examples. A voltage profile of an electrode containing 10 wt % bulk-$Na_2S$ without $Li_2S$ is also shown as a reference. As used herein, bulk-$Na_2S$ refers to the $Na_2S$ as received from the supplier as a micron sized material.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Rechargeable lithium sulfur (S) and/or selenium (Se) batteries are a promising alternative to lithium ion (Li-ion) batteries and they have attracted extensive research interests due to their high energy density. In a typical lithium sulfur cell, sulfur is reduced at the cathode where it reacts with Li$^+$ to initially form Li$_2$Sn (2<n≤8). The Li$_2$S$_n$ is then further reduced to Li$_2$S. Upon charging, the Li$_2$S is oxidized, removed from the electrode surface, and redeposited as elemental sulfur. Similarly, Li$_2$Se$_n$(2<n≤6) may be formed by lithiating Se at the cathode, and converting it to Li$_2$Se during discharge. During charging, Li$_2$Se is removed from the cathode surface and depositing it as elemental selenium. In comparison to S, Se has higher electron conductivity but lower energy density. Blending S and Se together is also an alternative configuration that is advantageous to reach an optimized setting of electron conductivity and energy density. Importantly, S, Se, and S/Se technologies require Li metal as the anode.

Lithiated S and/or Se may be an alternative starting cathode material for lithium sulfur/selenium batteries. Lithium metal anodes are undesirable in terms of cycle stability and safety. The use of Li$_2$S/Li$_2$Se importantly enables a Li-free anode such as graphite, silicon, tin, etc. Using micron-sized Li$_2$S/Li$_2$Se requires high excess energy on initial charge with very low Li$_2$S utilization. The first activation cycle of Li$_2$S produces Sn$^{2-}$ where 2<n≤8, and it serves as a redox mediator (soluble species that shuttle charge between solid materials) to assist in its activation.

Other metal sulfides/selenides such as those of alkali metals (i.e. Na and K) and alkali earth metals (i.e. Mg and Ca) have an achievable oxidation voltage for producing polysulfide-based redox mediators that are energy efficient for charging micron-sized Li$_2$S/Li$_2$Se or blend thereof.

It has now been found that the activation potential of lithium sulfide or lithium selenide electrochemical cells may be lowered by adding sacrificial amounts of an alkali metal sulfide or selenide (other than lithium sulfide or selenide) or an alkaline earth metal sulfide or selenide to the cathode upon assembly. Upon application of an initial charging current, a polysulfide and/or polyselenide anion is formed. Upon further application of the charging current, elemental sulfur or selenium is then formed. For example, with the combination of the lithium sulfide or selenide with a sodium sulfide or selenide, the overpotential may be reduced from approximately 4V to 3V.

Provided herein are rechargeable, non-aqueous, lithium electrochemical cells having more than one sulfur and/or selenium-source as a primary redox center in the cathode. One of the sulfur/selenium sources are used as an activation agent and exist at less than 50 wt % based upon the total weight of the cathode. This may include, for example, the sulfur/selenium sources exist at less than 40 wt %, less than 30 wt %, less than 20 wt %, less than 10 wt %, or less than 5 wt %, or from about 0 wt % to about 50 wt %, from about 0 wt % to about 10 wt %, or from about 0.0001 wt % to about 5 wt %, based upon the total weight of the cathode. The cathode includes other alkali metal and alkaline earth metal sulfides in the cathode composition. The addition of the alkali metal and alkali earth metal sulfide enhances the electrochemical performance of the cell and causes a remarkable decrease in charge overpotential to a low potential charge. As defined herein, a low charge overpotential is a charge overpotential of less than or equal to about 3.3 V, versus the Li$^+$/Li couple, during a first delithiation. This phenomenon is due to that fact that the thermodynamic oxidation potential of other alkali metal and alkaline earth metal sulfides and/or selenides are lower than Li$_2$S/Li$_2$Se. However, their oxidation generates polysulfide species that are redox mediators for the delithiation of Li$_2$S/Li$_2$Se.

In a typical Li$_2$S-based battery, inclusion of Li$_2$S usually requires pre-solvated redox mediators in the electrolyte. The use of redox mediators is typically critical for achieving an efficient activation process of Li$_2$S. However, the solvation of the redox mediator in an electrolyte mandates a certain concentration that is homogenous throughout the electrolyte. This is problematic for low electrolyte volume charging. However, it has now been found that redox mediators can be introduced in a dormant state (i.e. solid-state), where upon oxidation at a potential near the thermodynamic potential of Li$_2$S, redox mediators are generated to facilitate the charging of Li$_2$S with high utilization of active material.

In one aspect, a lithium-sulfur battery is provided. The lithium-sulfur battery includes a lithium-free anode, a separator, a lithium-containing cathode, and an electrolyte containing a lithium salt and an ether-based solvent. The concentration of the lithium salt in the solvent is from about 0.001 mol/L ("molar," or "M") to about 7 M.

In one aspect, a lithium-selenium battery is provided. The lithium-selenium battery includes a lithium-free anode, a separator, a lithium-containing cathode, and an electrolyte containing a lithium salt and an ether-based solvent. The concentration of the lithium salt in the solvent is from about 0.001 M to about 7 M.

In one aspect, a lithium-selenium/sulfur battery is provided. The lithium-selenium/sulfur active material ($Se_xS_y$, where x+y=1, 0<x<1, and 0<y<1) battery includes a lithium-free anode, a separator, a lithium-containing cathode, and an electrolyte containing a lithium salt and an ether-based solvent. The concentration of the lithium salt in the solvent is from about 0.001 M to about 7 M.

In the batteries described herein, the lithium salt may include a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li[SO_3CF_3]$; $Li[CF_3CO_2]$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiClO_4$; $LiBF_4$; $LiAsF_6$; $LiSbF_6$; $LiAlCl_4$; $LiPF_6$; $LiNO_3$; $Li_2SO_4$; $LiOH$; $Li[BF_2(C_2O_4)]$; $Li[B(C_2O_4)_2]$; $Li[PF_2(C_2O_4)_2]$; $Li[PF_4(C_2O_4)]$; $LiAsF_6$; $LiSbF_6$; $LiNO_3$; $Li_2(B_{12}X_{12-p}H_p)$; $Li_2(B_{10}X_{10-p}H_p)$; or a mixture of any two or more thereof, wherein X is independently at each occurrence F, Cl, Br, or I, p is 0, 1, 2, 3, 4, 5, 6, 7, 8, 9, 10, 11, or 12, and p' is 0, 1, 2, 3, 4, 5, 6, 7, 8, 9, or 10. In some embodiments, illustrative lithium salts include, but are not limited to, $LiSO_3CF_3$, $LiN(SO_2CF_3)_2$, $LiN(SO_2F)_2$, $LiPF_6$, $LiBF_4$, $LiClO_4$, $LiAsF_6$, $LiSiF_6$, $LiSbF_6$, $LiAlCl_4$, $LiNO_3$, $Li_2SO_4$, LiOH, or a mixture of any two or more thereof.

In any of the above embodiments, the cathode, prior to first charge, contains $Li_2S_xSe_y$, where x+y=1, 0≤x≤0, and 0≤y≤1, in an amount of >65 wt % based upon the mass of the electrode, and of one or more secondary alkali metal and/or alkline-earth metal sulfides at a percentage of about 1-3 wt % in electrode slurry composition with an oxidation potential thermodynamically lower than $Li_2S$. The remaining portion of the cathode is composed of binder and conductive carbon, and it may further include a current collector.

Illustrative conductive carbon materials include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjen Black®.

The binder may be present in the anodes in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

The cathode current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. Current collectors for the cathode may be made of a wire mesh.

In other embodiments, the anode includes a lithium metal or a combination of lithium metal and sodium metal. The anode may be lithium metal or a lithium-containing material such as a lithium metal oxide, silicon, pre-lithiated graphite, or a lithium metal alloys. In some embodiments, the anode may be a lithium/sodium alloy, or a lithium/sodium metal oxide.

In addition to the Li-ion storage active material, the anode may also include a current collector, a conductive carbon material, a binder, or any combination thereof.

The anode current collector may be prepared from a wide variety of materials. For example, illustrative current collectors include, but are not limited to, carbon, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

A binder may be present in the anodes in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In another aspect, provided herein are processes for charging any of the electrochemical devices or batteries described herein. The process includes applying a first charging current to the electrochemical device in an as-assembled, uncharged state to form polysulfide and/or polyselenide anions within the electrolyte. The anions so formed are charge compensated by non-lithium alkali metal cations and/or alkaline earth metal cations in the electrolyte. Upon continued application of the charging current, or application of a second, different charging current, elemental sulfur or selenium is produced.

The present invention, thus generally described, will be understood more readily by reference to the following examples, which are provided by way of illustration and are not intended to be limiting of the present invention.

EXAMPLES

Example 1

Lithium sulfur cells (2032 coin cells) were assembled using lithium foil (99.9%, MTI Corporation) as the anode, polypropylene separator in the form of 18 mm diameter discs (23 μm Celgard™ 2523) as the separator and H23I6 carbon fiber paper (Freudenberg FCCT) as the cathode current collector in the form of 16 mm diameter discs. A cathode active slurry coating was cast onto the carbon fiber paper using a doctor blade. The electrolyte included 1 M lithium bis(trifluoromethanesulfonyl)imide ($LiC_2F_6NO_4S_2$, "LiTFSI," 99.995%, Sigma-Aldrich) and 0.5M lithium nitrate ($LiNO_3$, Sigma-Aldrich). The salts were dried in a vacuum oven at 120° C. overnight prior to use to remove water. The solvent was a mixture of 1,3-dioxolane (DOL) and dimethoxyethane (DME) in equal volume parts, both solvents being dried over 3 Å molecular sieves (Sigma-Aldrich). The water content of the electrolytes was tested to be about 50 ppm using a Mettler Toledo C20 Karl Fischer Coulometer. The cells were assembled in an argon-filled glove box ($O_2$<0.1 ppm, water <0.5 ppm).

A voltage window of 1.75-4.0 V (vs. $Li^+$/Li) and a current of 0.05 C (1C=1.171 mA $mg_{Li2S}^{-1}$) was applied to the cells (FIG. 1). The areal mass loading of $Li_2S$ was at 2 $mg_{Li2S}$ $cm^{-2}$ and the electrolyte content was at 8 μL $mg_{Li2S}^{-1}$.

Figure 2:
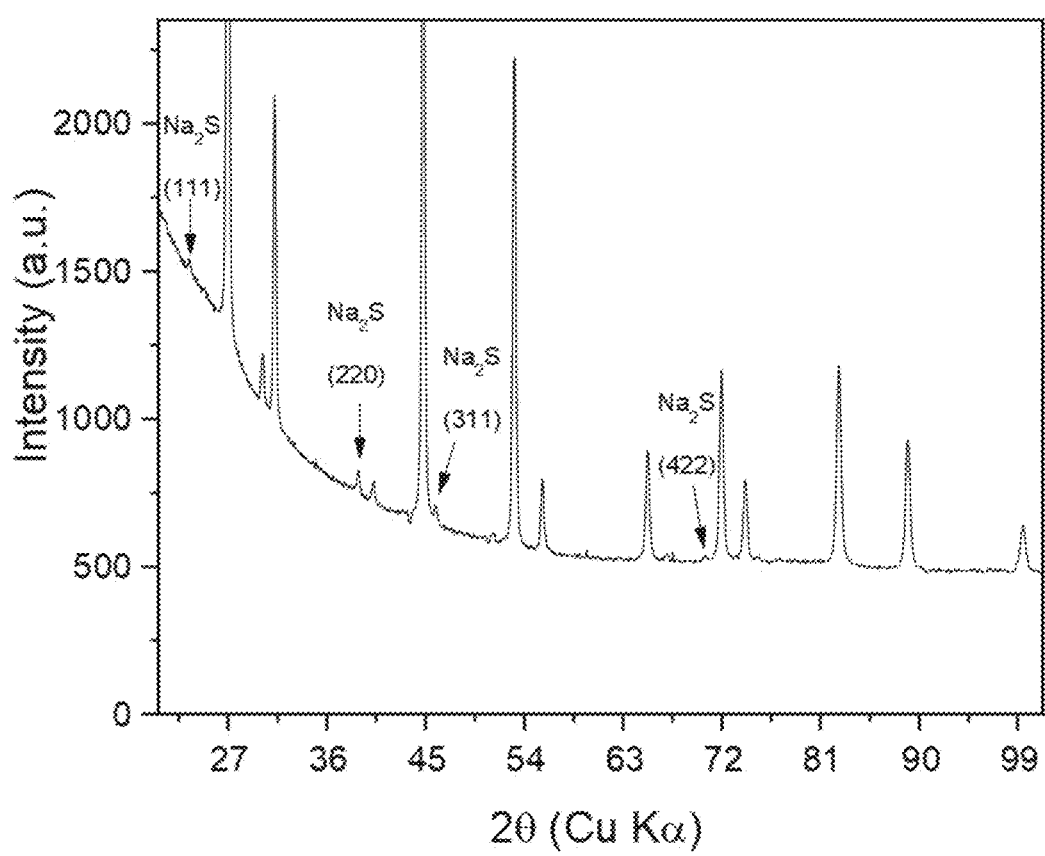
FIG. 2 is an X-ray diffraction pattern of electrode material containing 3 wt % bulk-$Na_2S$ and 70 wt % $Li_2S$ with the $Na_2S$ (111), (220), (311), and (422) peaks labeled, according to the examples.

X-ray diffraction measurements were performed and show that the $Na_2S$ was present in the as-cast pristine electrode as a solid crystal. FIG. 2 identifies the diffraction peaks of $Na_2S$ (111), (220), (311) and (422) reflections with black arrows.

Example 2

Figure 3:
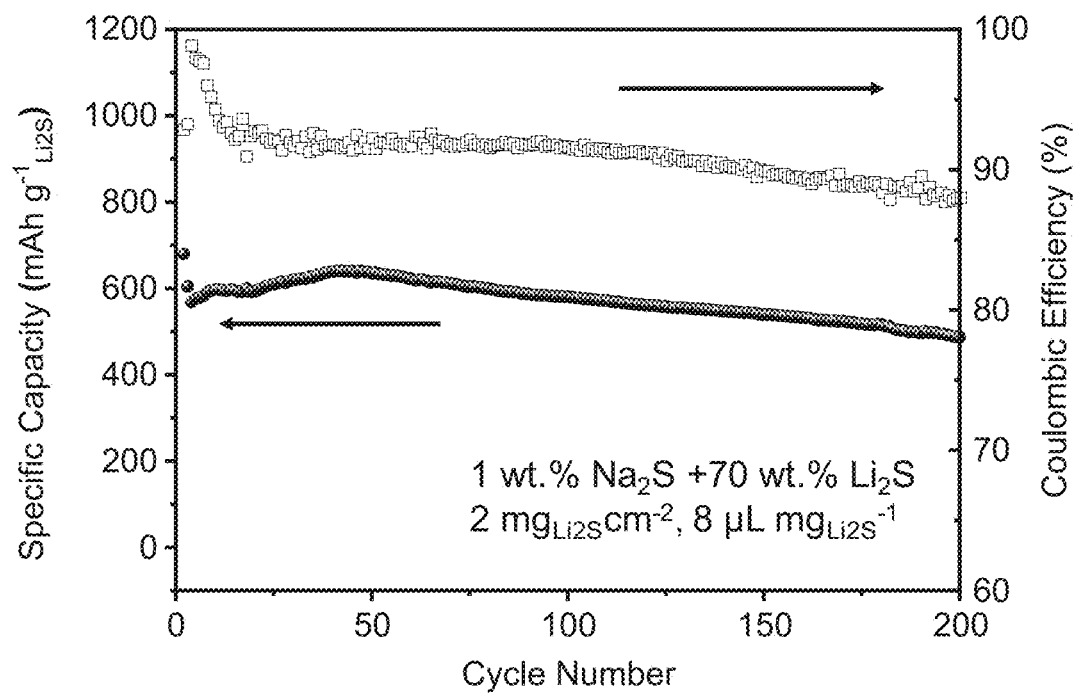
FIG. 3 is a composite graph of the specific capacity (left y-axis) and Coulombic efficiency (right y-axis) of an electrode containing 1 wt % $Na_2S$, 70 wt % $Li_2S$ at 2 $mg_{Li2S}$ $cm^{-2}$ and 8 µL $mg_{Li2S}^{-1}$, according to the examples.
Figure 4:
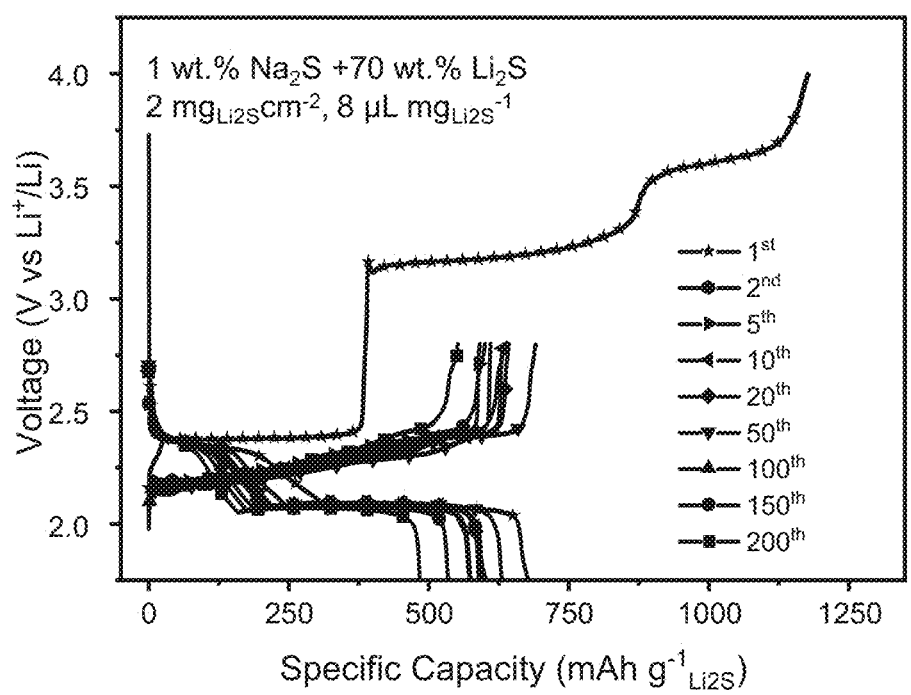
FIG. 4 is a graph of composite voltage charge/discharge profiles of an electrode containing 1 wt % $Na_2S$, 70 wt % $Li_2S$ at 2 $mg_{Li2S}$ $cm^{-2}$ and 8 µL $mg_{Li2S}^{-1}$ at cycle number: 1, 2, 5, 10, 20, 50, 100, 150, and 200, according to the examples.
Figure 5:
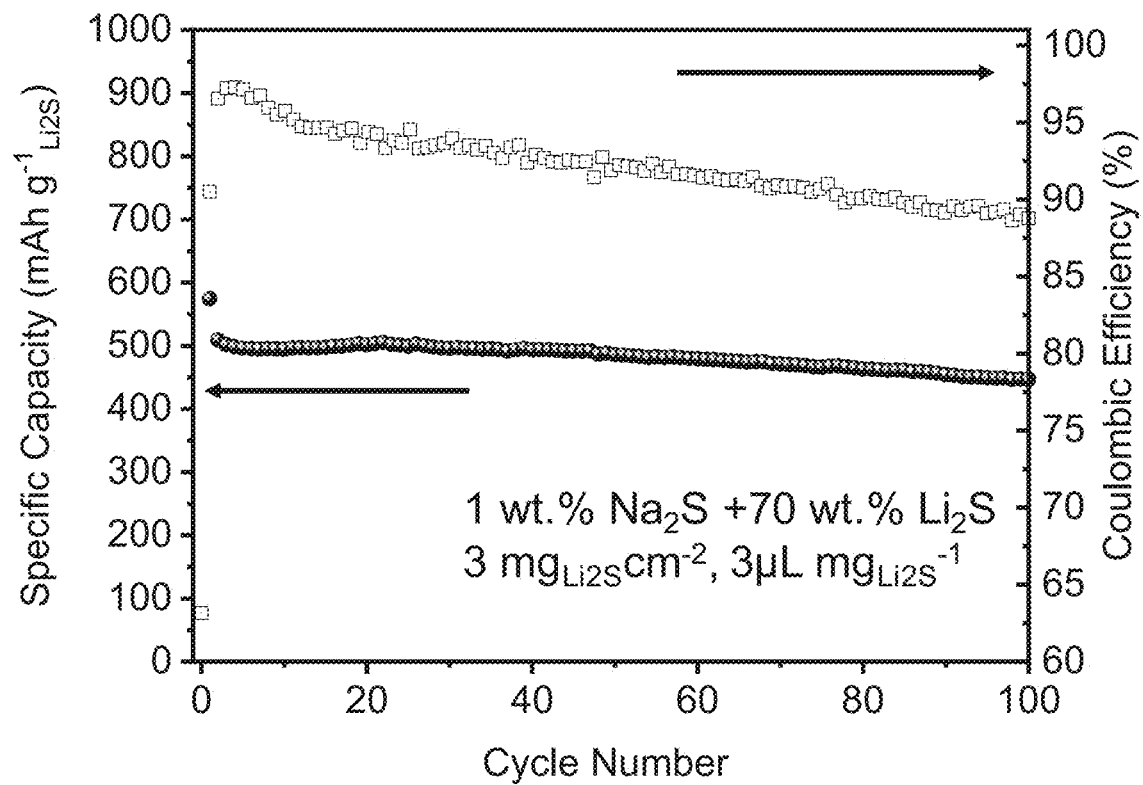
FIG. 5 is a graph of composite graph of the specific capacity (left y-axis) and Coulombic efficiency (right y-axis) of an electrode containing 1 wt % $Na_2S$+70 wt % $Li_2S$ at 3 $mg_{Li2S}$ $cm^{-2}$ and 3 µL $mg_{Li2S}^{-1}$, according to the examples.
Figure 6:
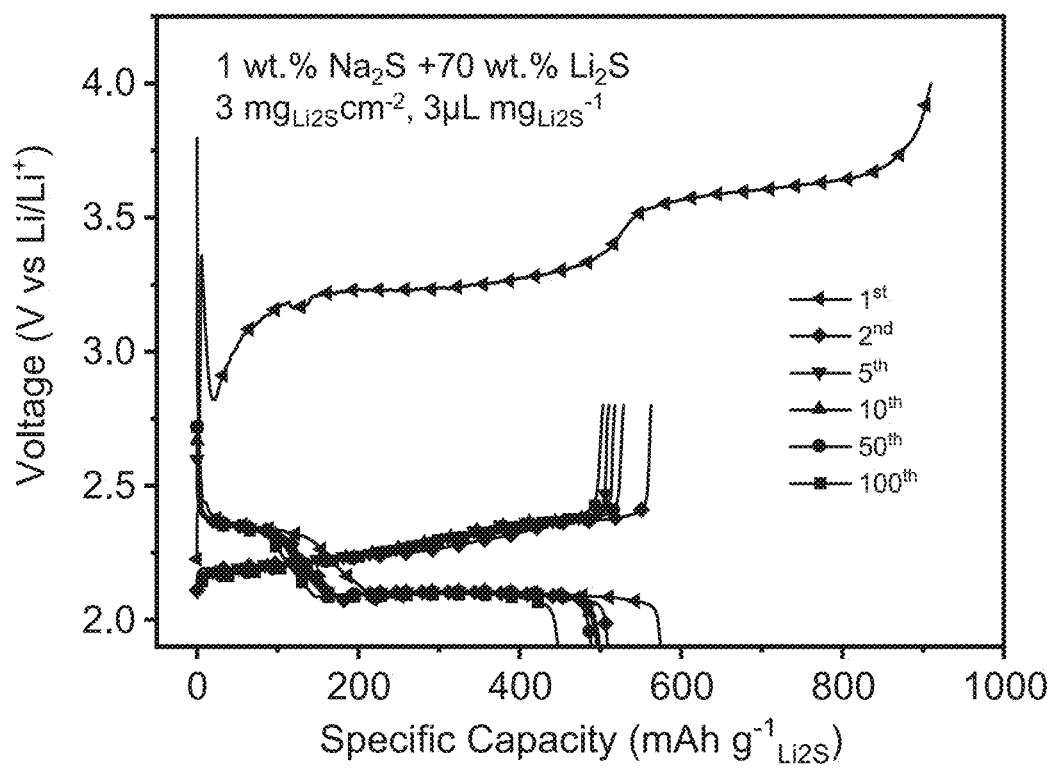
FIG. 6 is a graph of composite voltage charge/discharge profiles of an electrode containing 1 wt. % Na$_2$S+70 wt % Li$_2$S at 3 mg$_{Li2s}$ cm$^{-2}$ and 3 μL mg$_{Li2S}$$^{-1}$ at cycle number: 1, 2, 5, 10, 50, and 100, according to the examples.
Figure 7:
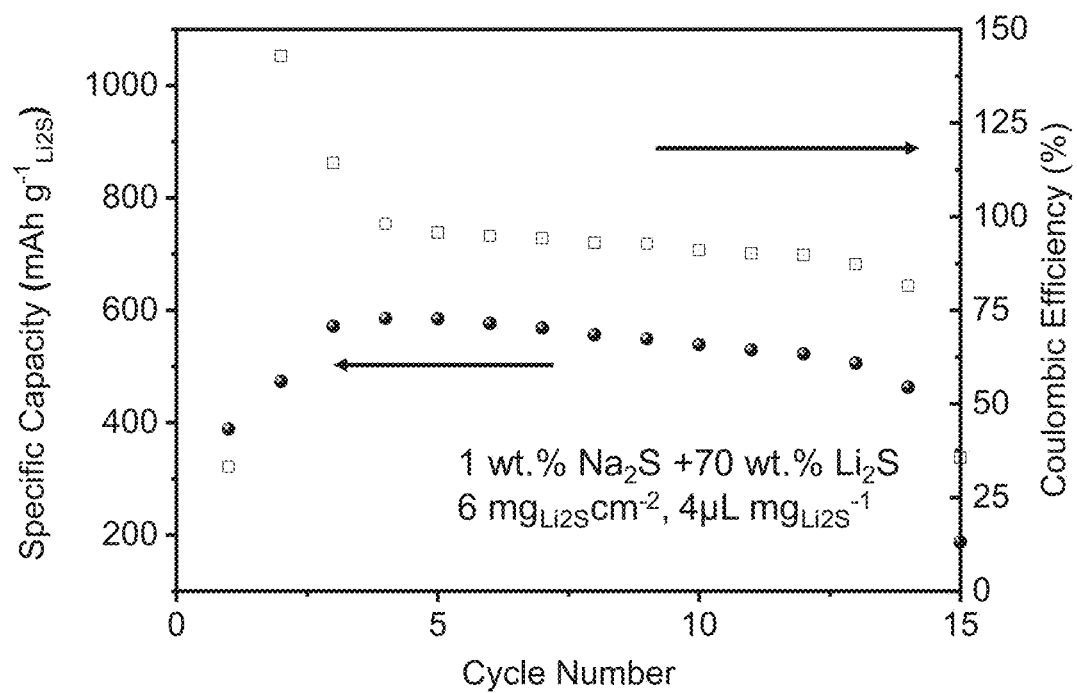
FIG. 7 is a graph of composite of the specific capacity (left y-axis) and Coulombic efficiency (right y-axis) of an electrode containing 1 wt. % Na$_2$S+70 wt % Li$_2$S at 6 mg$_{Li2S}$ cm$^{-2}$ and 4 μL mg$_{Li2S}$$^{-1}$, according to the examples.
Figure 8:
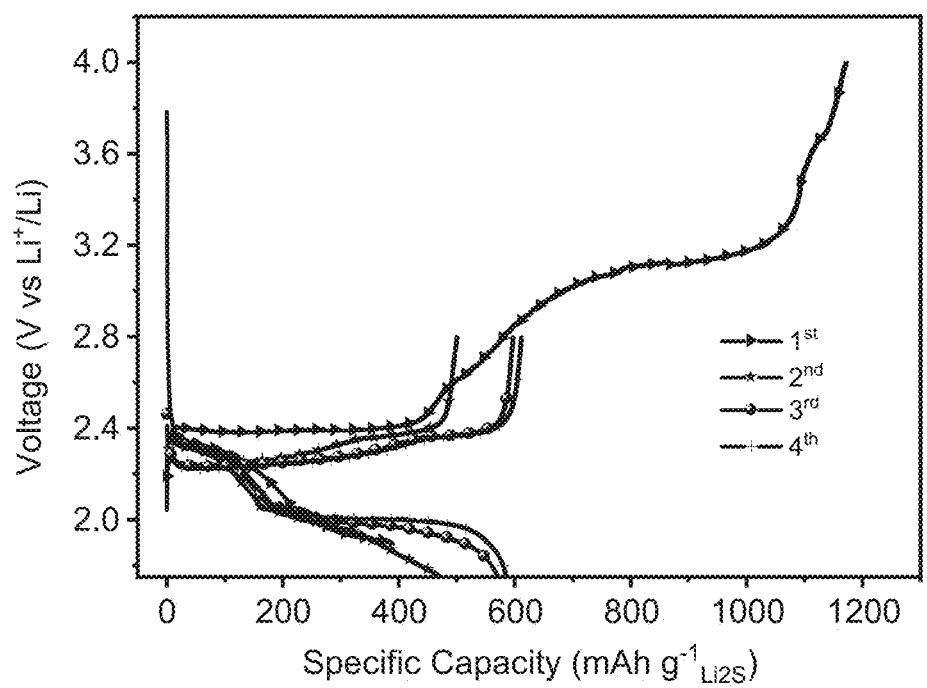
FIG. 8 is a graph of composite voltage charge/discharge profiles of an electrode containing 1 wt. % Na$_2$S+70 wt % Li$_2$S at 6 mg$_{Li2S}$ cm$^{-2}$ and 4 μL mg$_{Li2S}$$^{-1}$ at cycle number: 1, 2, 3, and 4, according to the examples.

Lithium-sulfur batteries with differing $Li_2S$ areal mass loading and electrolyte content were tested in a similar manner to Example 1. Electrochemical cycle life performance (cycle stability plots) is shown as a graph of specific capacity (left axis) and Coulombic efficiency (right axis) versus cycle number. Corresponding voltage profiles (voltage plots) at various cycle number are also shown in graphic form. For $Li_2S$ areal mass loading and electrolyte content of 2 $mg_{Li2S}$ $cm^{-2}$ and 8 μL $mg_{Li2S}^{-1}$, the Cycle Stability Plot is shown in FIG. 3 and the Voltage Plot is shown in FIG. 4. For $Li_2S$ areal mass loading and electrolyte content of 3 $mg_{Li2S}$ $cm^{-2}$ and 3 μL $mg_{Li2S}^{-1}$, the Cycle Stability Plot is shown in FIG. 5 and the Voltage Plot is shown in FIG. 6. For $Li_2S$ areal mass loading and electrolyte content of 6 $mg_{Li2S}$ $cm^{-2}$ and 4 μL $mg_{Li2S}^{-1}$, the Cycle Stability Plot is shown in FIG. 7 and the Voltage Plot is shown in FIG. 8. It is surprising that it is functional at rather harsh cell conditions ($Li_2S$ area-based mass loading and electrolyte to $Li_2S$ ratio).

Figure 9:
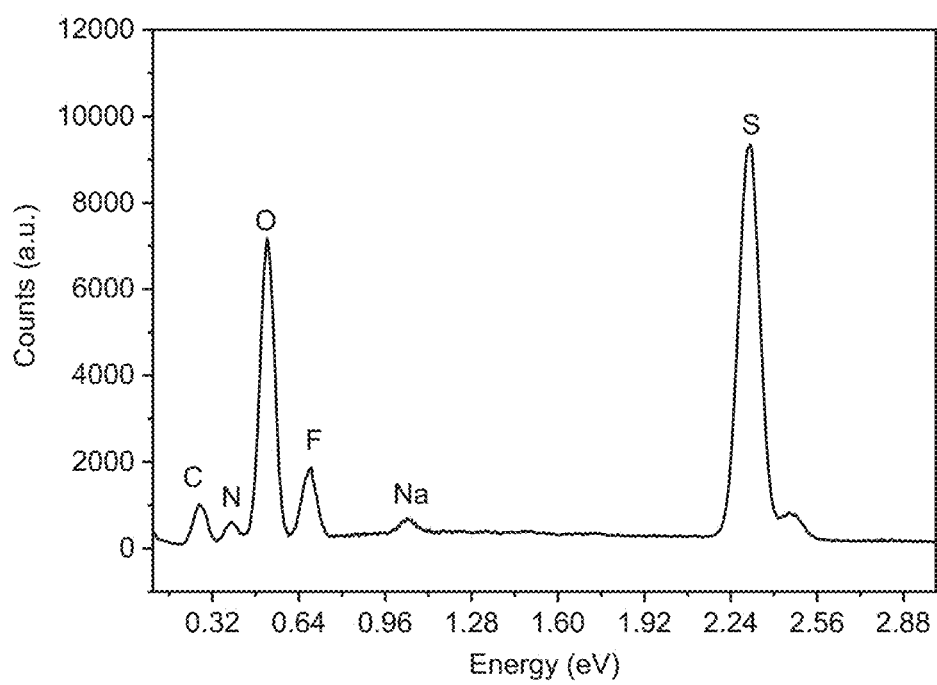
FIG. 9 is a graph of energy dispersive spectroscopy of a counter/reference electrode (Li metal) after a 1$^{st}$ charge of an electrode containing 3 wt. % Na$_2$S+70 wt % Li$_2$S. With the energy of C, N, O, F, S, and Na indicated, according to the examples.

Energy dispersive spectroscopy of the surface of the anode after a single full charge was investigated and shown in FIG. 9. FIG. 9 illustrates the presence of a significant amount of Na.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:
   a cathode comprising:
      a first cathode component comprising lithium and $Se_xS_y$, wherein x+y=1, 0≤x≤1, and 0≤y≤1; and
      a second cathode component comprising sodium sulfide, sodium selenide, or a mixture thereof;
   an anode;
   a porous separator; and
   a non-aqueous electrolyte comprising one or more lithium salts, and one or more aprotic solvents;
   wherein:
      the electrochemical device is a lithium sulfur and/or lithium selenide battery.

2. The electrochemical device of claim 1, wherein the anode comprises lithium.

3. The electrochemical device of claim 1, wherein the anode is lithium free.

4. The electrochemical device of claim 1 which is an as-prepared device.

5. The electrochemical device of claim 1 further comprising an initial discharge product comprising a polyselenide and/or polysulfide anion compensated by an alkali metal and/or alkaline earth metal cation.

6. The electrochemical device of claim 1, wherein the lithium salt comprises a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2', 2"-tris(trifluoromethyl)benzotris(imidazolate); $LiN(CN)_2$; $Li[SO_3CF_3]$; $Li[CF_3CO_2]$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiClO_4$; $LiBF_4$; $LiAlCl_4$; $LiPF_6$; $Li_2SO_4$; $LiOH$; $Li[BF_2(C_2O_4)]$; $Li[B(C_2O_4)_2]$; $Li[PF_2(C_2O_4)_2]$; $Li[PF_4(C_2O_4)]$; $LiAsF_6$; $LiSbF_6$; $LiNO_3$; $Li_2(B_{12}X_{12}\text{-pHp})$; $Li_2(B_{10}X_{10}\text{-pHp})$; or a mixture of any two or more thereof, wherein X is independently at each occurrence F, Cl, Br, or I, p is 0, 1, 2, 3, 4, 5, 6, 7, 8, 9, 10, 11, or 12, and p' is 0, 1, 2, 3, 4, 5, 6, 7, 8, 9, or 10.

7. The electrochemical device of claim 1, wherein the lithium salt comprises $Li[N(SO_2CF_3)_2]$, $LiNO_3$, or a mixture thereof.

8. The electrochemical device of claim 1, wherein a ratio of the first cathode component to the second cathode component is from 80 to 10.

9. The electrochemical device of claim 1, wherein a ratio of lithium to sodium is from 80 to 10.

10. The electrochemical device of claim 1, wherein the aprotic solvent comprises an ether.

11. The electrochemical device of claim 10, wherein the ether is dimethoxyethane (DME), 1,3 dioxolane (DOL), diethylene glycol dimethyl ether (DEGDME), triethylene glycol dimethyl ether, tetraethylene glycol dimethyl ether (TEGDME), or a mixture of any two or more thereof.

12. The electrochemical device of claim 1, wherein the cathode, prior to a first discharge charge cycle, is free of polysulfide anion, polyselenide anion, elemental sulfur, and elemental selenium.

13. The electrochemical device of claim 1 which is configured to, after a first charge cycle, comprise elemental sulfur.

14. The electrochemical device of claim 1, wherein the anode comprises lithium, lithiated carbon, lithiated tin, lithiated silicon, sodium, sodiated carbon, sodiated tin, sodiated silicon, potassium, potassiated carbon, potassiated tin, potassiated silicon, magnesium, magnesiated carbon, magnesiated tin, magnesiated silicon, zinc, zincated carbon, zincated tin, zincated silicon, or a mixture of any two or more thereof.

15. The electrochemical device of claim 1, wherein the anode further comprises a current collector, a conductive carbon material, a binder, or any combination thereof.

16. The electrochemical device of claim 1, wherein the porous separator comprises a glass fiber material, a carbon fiber material, polyethylene, solid state membranes, or a combination of any two or more thereof.

17. The electrochemical device of claim 1, wherein the cathode further comprises:
   a current collector comprising copper, stainless steel, or titanium; and
   a conductive carbon material comprising synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, or a mixture of any two or more thereof.

18. A process of charging the electrochemical device of claim 1, the process comprising: applying a first charging current to the electrochemical device in an as-assembled, uncharged state to form polysulfide and/or polyselenide anions within the electrolyte.

19. The process of claim 18, wherein upon further application of the first charging current, elemental sulfur is formed.

* * * * *